A. W. LINES.
CHECK CONTROLLED MACHINE.
APPLICATION FILED JAN. 28, 1911.

1,070,901.

Patented Aug. 19, 1913.
3 SHEETS—SHEET 1.

Inventor
Albert W. Lines.

Witnesses

By Victor J. Evans
Attorney

A. W. LINES.
CHECK CONTROLLED MACHINE.
APPLICATION FILED JAN. 28, 1911.
1,070,901.
Patented Aug. 19, 1913.
3 SHEETS—SHEET 2.
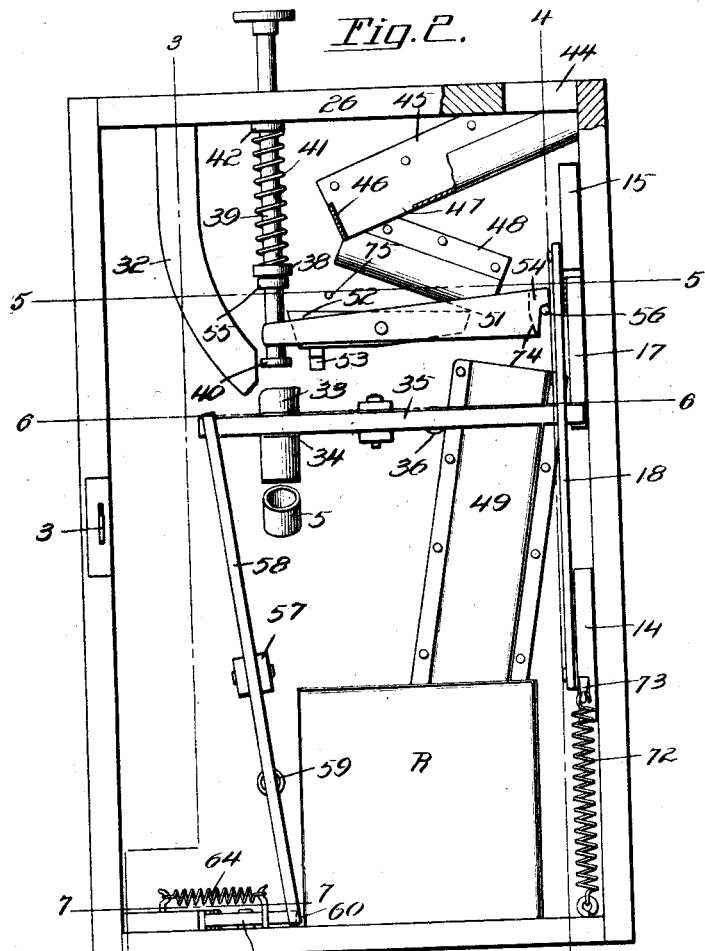
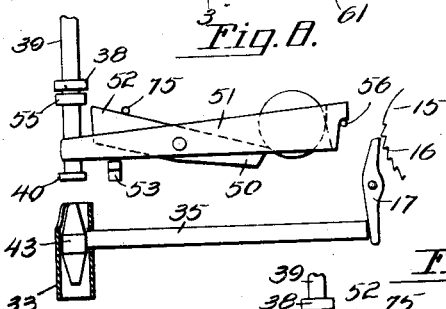
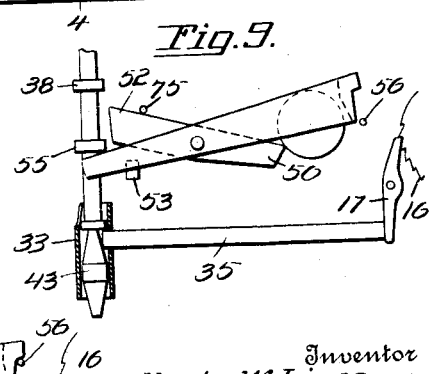
Witnesses
F. C. Gibson.
Inventor
Albert W. Lines.
By Victor J. Evans
Attorney

A. W. LINES.
CHECK CONTROLLED MACHINE.
APPLICATION FILED JAN. 28, 1911.

1,070,901.

Patented Aug. 19, 1913.
3 SHEETS—SHEET 3.

Witnesses
F. C. Gilson.

Inventor,
Albert W. Lines.

By Victor J. Evans
Attorney

UNITED STATES PATENT OFFICE.

ALBERT W. LINES, OF PUEBLO, COLORADO.

CHECK-CONTROLLED MACHINE.

1,070,901.  Specification of Letters Patent.  Patented Aug. 19, 1913.

Application filed January 28, 1911. Serial No. 605,247.

*To all whom it may concern:*

Be it known that I, ALBERT W. LINES, a citizen of the United States, residing at Pueblo, in the county of Pueblo and State of Colorado, have invented new and useful Improvements in Check-Controlled Machines, of which the following is a specification.

This invention relates to coin or check controlled machines and more particularly to check controlled hat, coat, and umbrella racks.

One of the principal objects of the invention is the provision of hat, coat and umbrella supporting hooks which are adapted to be locked together with a check controlled mechanism for holding the same in locked position and a coin controlled mechanism for placing the check controlled mechanism in condition to be operated.

A further object of the invention is the provision of means for supporting hat, coat and umbrella and means for locking these articles in position upon the holder, together with a check controlled locking mechanism and a coin controlled release therefor, whereby the check may be dispensed.

A still further object of the invention is the provision of hat, coat and umbrella supporting and locking means which includes a tripping lever adapted to normally hold the check within the machine together with a coin controlled plunger limiting device which is actuated by the coin to throw the same out of the path of the plunger, whereby the check may be discharged from the machine.

Further objects of the invention will appear as the following specific description is read in connection with the accompanying drawings, which form a part of this application, and in which:—

Figure 1:
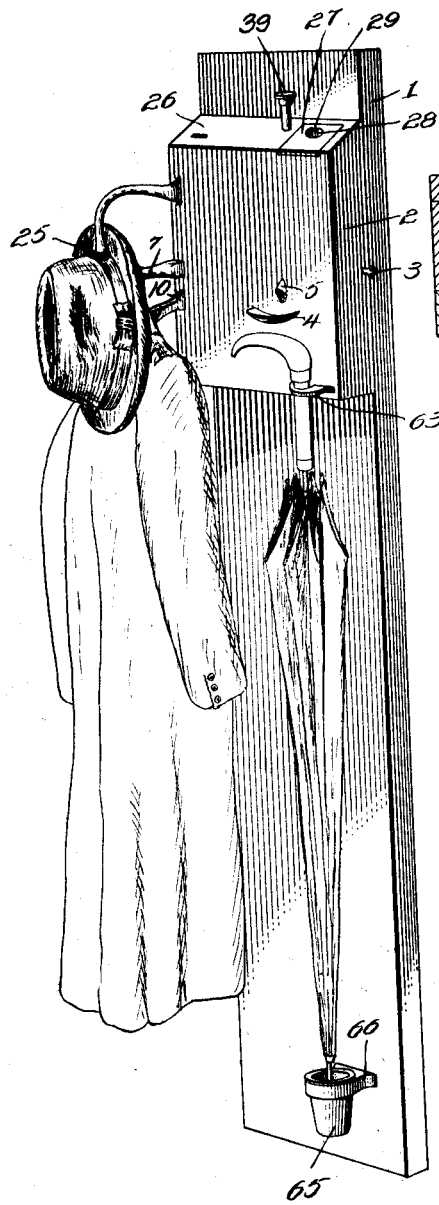
Figure 5:
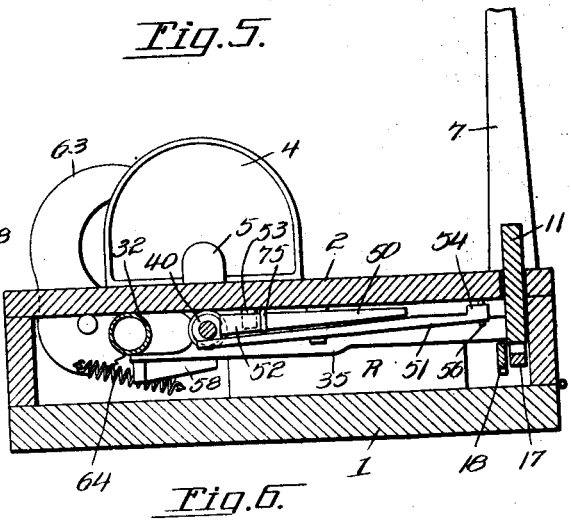
Figure 6:
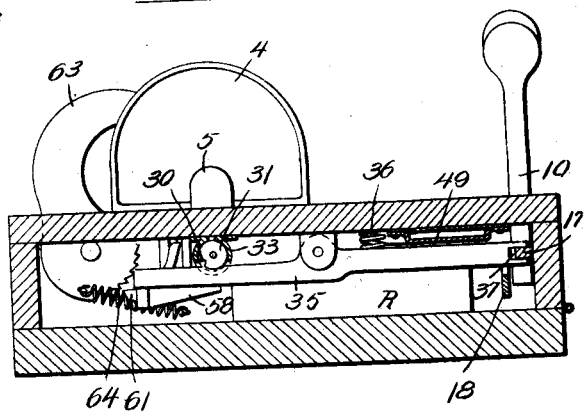
Figure 7:
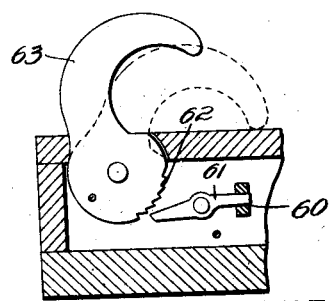
Figure 3:
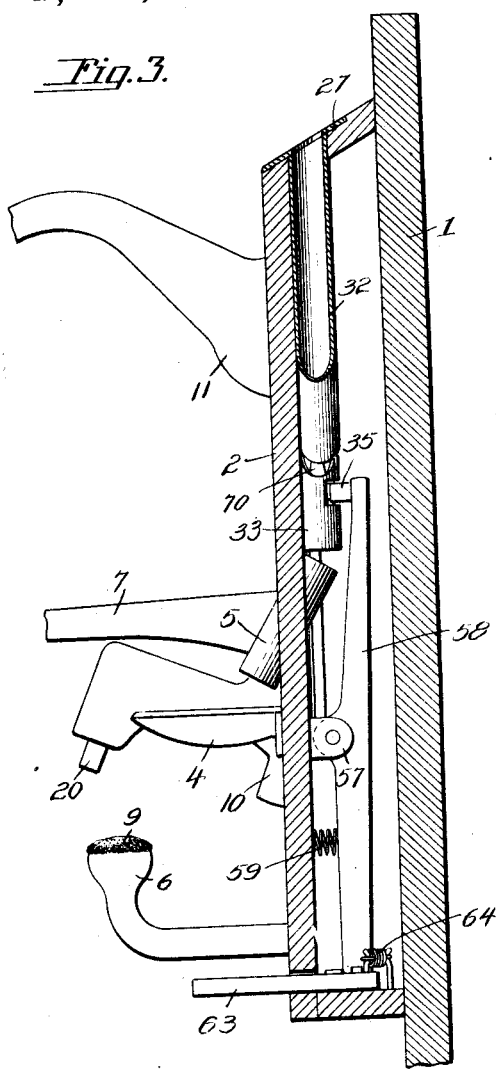
Figure 4:
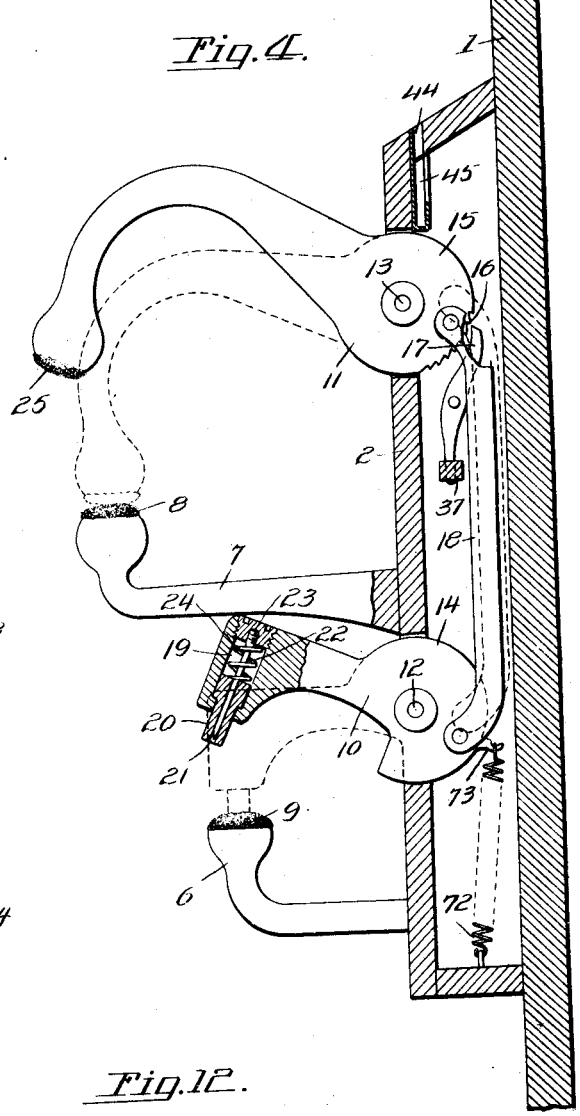
Figure 11:
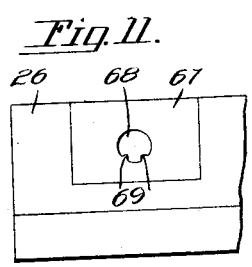
Figure 12:
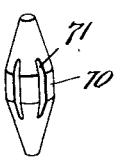

Figure 1 is a perspective view of the device. Fig. 2 is a vertical elevation of the interior of the casing removed from the back board. Fig. 3 is a section on the line 3—3 of Fig. 2. Fig. 4 is a similar view on the line 4—4 of Fig. 2. Fig. 5 is a horizontal section taken on the line 5—5 of Fig. 2. Fig. 6 is a similar view taken on the line 6—6 of Fig. 2. Fig. 7 is an enlarged detailed sectional view on the line 7—7 of Fig. 2. Figs. 8, 9 and 10 are diagrammatic views showing the different positions of the parts. Fig. 11 is a detail top plan view showing a modified form of check plate. Fig. 12 is a detail perspective view of the check adapted to be used in connection with the plate shown in Fig. 11.

Referring more particularly to the drawings, 1 represents the back board upon which is hinged a casing 2 adapted to be locked in position by the key operated lock 3. This casing has projecting from its front face a cup 4 adapted to receive the check or key from the chute 5, as will be hereinafter described. Projecting from one side of the casing are the coat, and hat supporting arms 6 and 7 both of which are rigidly secured to the casing and have upon their outer ends pads 8 and 9, the latter being sufficiently thick to receive a locking pin to be hereinafter described. Coacting with the arms 6 and 7 are locking arms 10 and 11 which are pivoted to the casing at 12 and 13 and have circular heads 14 and 15, the latter of which is provided with a ratchet edge 16 adapted to be engaged by the locking pawl 17. These circular heads are connected together by a link 18 so that they move in unison and the arm 10 is provided in its outer end with a socket or aperture 19. Mounted in the socket or aperture is a plunger 20 which is provided with a central channel 21 through which passes a pin 22 held stationary in the plug 23 which is threaded into the upper end of the aperture. When the arm 10 is depressed, as will hereinafter be described, the plunger contacts with the pad 9 and rides up in the aperture against the tension of the spring 24. The pin 22, being stationary with the arm, punctures the coat or garment held upon the arm 6 and enters the pad 9, thus effectively holding the garment in position. The arm 11 is also provided with a pad 25 at its outer end which is adapted to contact with the pad 8. Thus there is a cushioning engagement on either side of the hat or bonnet supported by the arm 7.

The casing 2 is provided with an inclined top 26 in which is mounted a plate 27 having a key or check aperture 28 formed therein formed with an inwardly projecting lip or tongue 29 adapted to engage a groove 30 formed in the key or check 31. The aperture 28 communicates with a key chute 32 whose discharge end is locked in position to pass the check into the check receiving and holding tube 33. The tube 33 is slotted at 34 and seated in the slot is a controlling lever 35 which is held in operative position by a spring 36. One end of the lever is bifurcated at 37 to receive the lower end of the pawl 17. The tube 33 has an internal diameter slightly greater than the exterior diameter of the check but when the lever 35 is in the slot a restricted passage is formed for the check or key 31 which prevents its accidental passage through the tube to the chute.

Slidably mounted in the top 26 and in a bearing collar 38 is a plunger 39 which is arranged coincident with and adapted to extend down into the tube 33 and is provided with a check engaging head 40 at one end. The plunger is normally kept in inoperative position or raised out of the tube 33 by a spring 41 which surrounds the plunger between the bearing 38 and a collar 42 secured thereon. When depressed this plunger is adapted to force the check into the position shown in Fig. 8 where its straight side 43 will be engaged and held by the lever 35 and also to force the check entirely through the tube, as will hereinafter be described. The casing is provided with a coin slot 44 which is arranged coincident with a coin chute 45 inclined from its upper end to its lower end and at the latter provided with a stop 46 which prevents a coin from passing through the chute and causes it to drop through a slot 47 formed therein on to a coin chute 48 which extends downwardly and has its discharge end positioned immediately above the receiving chute 49 which is adapted to deposit the coin into a coin receptacle R.

Positioned between the chute 48 and the chute 49 are a pair of levers 50 and 51, the former of which is provided with a heavy undercut end 52 which normally rests upon a stop 53. The opposite end of the lever is arranged between the lever 51 and the front of the casing and coacts with an offset lug 54 on the lever 51 to hold the coin or check in position until released by the plunger, as will be described. The end 52 of the lever 50 is arranged in the path of a collar 55, as is also the end of the lever 51, and the lever 50 is adapted to have its end 52 overbalanced by the coin or check which is held between the same and the lug 54. The heavy or lug end of the lever 51 normally rests upon a stop 56 and is only displaced therefrom by the engagement of the collar 55 with the opposite end of the lever.

Pivoted in ears 57 is a lever 58 whose upper end is held in engagement with the lever 35 by a spring 59 whose lower end is bifurcated, as at 60, to receive the rear end of the locking pawl 61. This locking pawl is normally thrown into engagement with the rack surface 62 on the umbrella holding hook 63 by the spring 59 and is thrown out of engagement by the operation of the check 31 passing through the tube 33. The umbrella hook 63 is thrown to inoperative position when the pawl is released by a spring 64. The lower end of the umbrella or cane is supported in a cup 65 which is carried in a bracket 66 secured to the back board 1.

In Fig. 11 the top 26 is shown as provided with a plate 67 having an aperture 68 therein with a plurality of projections 69 adapted to receive a key 70 having an aperture or groove 71 therein to register or receive the projections. This arrangement may be varied innumerable times and the checks may be either smaller than the one shown so that they will pass entirely through a normal sized tube 33 without engaging the lever or they may be larger so as not to pass through the plate in the tube. The projections and grooves may be placed at different distances around the aperture and key and any given number of projections or grooves or any suitable shapes may be utilized to prevent fraudulent actuation of the parts.

In the operation of the device we will assume that, for instance, there is no check in the machine and that the arms 10 and 11 are locked in closed position. The check corresponding with the aperture in the plate 27 is passed through said plate into the chute 32 and thereby into the tube 33, the plunger is now depressed until the collar 55 comes into contact with the end 52 of the lever 50 which limits the movement of the plunger and forces the key to the position shown in Fig. 8. In this position the check presses the lever 35 outwardly away from the tube so as to throw the lower end of the pawl outwardly and its upper tooth engaging end inwardly. This releases the arms 10 and 11 and at the same time releases the pawl 61 from the rack surface 62 on the hook 63. The arms 10 and 11 are raised by a spring 72 which is connected to the lower end of the casing and to a hook 73 on the head 14, while the hook 63 is thrown to open position by means of the spring 64. In this position of the arms and the hook the hat, coat and umbrella may be placed upon the arms 6 and 7 and in the hook 63. Now if a coin of suitable denomination is dropped into the slot 44 it will roll down the inclined chute 45, pass through the slot 47 and roll down the chute 48 where it is engaged between the light end of the lever 50 and the lug 54 on the heavy end of the lever 51. In this position of the coin the heavy end 52 of the lever 50 is raised so as to be thrown out of the path of the collar 55 so that the plunger may be depressed for further movement to eject the key, as shown in Fig. 9. This movement of the plunger brings the collar into engagement with the light end of the lever 51 and thereby raises its heavy end so as to release the coin, the lug being cut away on its under side, as shown at 74, to permit this release. When the check is discharged from the tube 33 it falls into the chute 5 and from thence into the cup 4. The user of the device then depresses the arms 10 and 11 and throws the hook 63 to closed position. These parts are locked by means of the pawls 17 and 61 until the check is deposited in the tube 33, as before described. After the check has been discharged the lever 35 moves into the slot 34 in the tube 33. The pawls 17 and 61 are thrown into engagement with their respective rack surfaces so as to lock the parts in closed position. When the check is again inserted into the tube 33 and the plunger depressed to the position shown in Fig. 10 the lever 35 will be again moved outwardly from the tube and the pawls 17 and 61 released so that the springs 72 and 64 may act to raise the arms 10 and 13 and throw the hook 63 to open position. In this operation it will be noticed that the check or key 31 is left in the tube so as to hold the lever in thrown position whereby the arms 10 and 11 and the hook 16 remain in open position until a coin is deposited so as to throw the lever 52 and permit the plunger to eject the check, and it will be also noticed that the plunger cannot be depressed fully until a coin is deposited to overbalance the heavy end of the lever 52. When overbalanced the end 52 of the lever is limited in its movement by a stop 75 which prevents the check or coin from dropping straight through from the chute 48 to the chute 49.

Having thus described the invention, what I claim as new is:—

1. The combination with a supporting arm, of a pivoted locking arm adapted to coact therewith, locking means therefor, check operated means for releasing said locking means, a plunger for throwing the check into releasing position, and a lever for limiting the movement of the plunger.

2. The combination with a supporting arm, of a pivoted locking arm adapted to coact therewith, means for locking the same, check controlled means for releasing said locking means, a plunger for throwing the check to operative position, means for limiting the movement of the plunger, means for throwing the limiting means out of limiting position, whereby the plunger may be fully depressed to eject the check, and means operated in the full movement of the plunger to release the throwing means.

3. The combination with a supporting arm, of a pivoted arm adapted to coact therewith, a locking mechanism therefor, check controlled means for releasing said locking mechanism, a spring retracted plunger for throwing the check to releasing position, means to limit the movement of the plunger, means controlled by a second check to release the same from limiting position, a lever coacting with said limiting means to hold the second check in operating position, and means carried by the plunger and adapted to act against said lever in the further movement of the plunger to release said second check and permit the limiting means to return to normal limiting position.

In testimony whereof I affix my signature in presence of two witnesses.

ALBERT W. LINES.

Witnesses:
M. L. ROBERSON, -
A. L. PRICE.

Copies of this patent may be obtained for five cents each, by addressing the "Commissioner of Patents, Washington, D. C."